United States Patent [19]

Arcella et al.

[11] Patent Number: 5,473,030

[45] Date of Patent: Dec. 5, 1995

[54] PROCESS FOR PREPARING VINYLIDENEFLUORIDE POLYMERS

[75] Inventors: Vincenzo Arcella, Novara, Italy; Bradley Kent, Bedminster, N.J.; Patrizia Maccone; Giulio Brinati, both of Milan, Italy

[73] Assignee: Ausimont S.p.A., Milan, Italy

[21] Appl. No.: 345,769

[22] Filed: Nov. 22, 1994

[30] Foreign Application Priority Data

Nov. 25, 1993 [IT] Italy .................... MI93A2491

[51] Int. Cl.$^6$ .................................................... C08F 2/00
[52] U.S. Cl. ........................................ 526/206; 526/255
[58] Field of Search ............................................ 526/206

[56] References Cited

U.S. PATENT DOCUMENTS

| | | |
|---|---|---|
| 3,193,539 | 7/1965 | Hauptschein . |
| 3,235,537 | 2/1966 | Albin et al. . |
| 3,475,396 | 10/1969 | McCain et al. . |
| 3,937,690 | 2/1976 | Weisgerber et al. . |
| 4,000,356 | 12/1976 | Weisgerber et al. ............... 526/206 |
| 4,025,709 | 5/1977 | Blaise et al. . |
| 4,360,652 | 11/1982 | Dohany . |
| 4,524,194 | 6/1985 | Dumoulin . |
| 4,569,973 | 2/1986 | Barber ............................ 526/206 |
| 4,789,717 | 12/1988 | Giannetti et al. . |
| 4,864,006 | 9/1989 | Giannetti et al. . |
| 4,967,023 | 10/1990 | Carmello et al. . |
| 5,037,914 | 8/1991 | Monti ............................. 526/206 |
| 5,095,081 | 3/1992 | Bacque et al. . |
| 5,276,261 | 1/1994 | Mayer et al. ..................... 526/206 |

FOREIGN PATENT DOCUMENTS

| | | |
|---|---|---|
| 0169328A2 | 1/1986 | European Pat. Off. . |
| 0626369A1 | 11/1994 | European Pat. Off. . |
| 0625526A1 | 11/1994 | European Pat. Off. . |
| 4139665 | 6/1993 | Germany ........................ 526/255 |
| 5090690 | 7/1975 | Japan ............................ 526/255 |
| 5141085 | 4/1976 | Japan ............................ 526/206 |
| 5525412 | 2/1980 | Japan ............................ 526/255 |
| 1057088 | 2/1967 | United Kingdom ................ 526/206 |

Primary Examiner—Joseph L. Schofer
Assistant Examiner—N. Sarofin
Attorney, Agent, or Firm—Finnegan, Henderson, Farabow, Garrett & Dunner

[57] ABSTRACT

Object of the present invention is a process for preparing vinylidenefluoride (VDF) polymers which comprises polymerizing VDF, optionally in association with other fluorinated oiefins in an aqueous medium in the presence of a radical initiator and of 1,1,1-trifluoro-2,2-dichloroethane (HCFC-123) as chain transfer agent.

A final product with very good colour characteristics (appearance), substantially devoid of discoloration effects at high temperatures, is so obtained.

4 Claims, No Drawings

PROCESS FOR PREPARING VINYLIDENEFLUORIDE POLYMERS

The present invention relates to a process for preparing vinylidenefluoride (VDF) polymers by polymerization in an aqueous medium in the presence of radical initiators and of a suitable chain transfer agent.

It is known that polyvinylidenefluoride (PVDF) and the VDF copolymers with other fluorinated olefins (for instance hexafluoropropene or tetrafluoroethylene) can be prepared by polymerization in an aqueous medium, using organic or inorganic peroxides as initiators. The most commonly used are diterbutylperoxide (DTBP) (see U.S. Pat. No. 3,193,539) and diisopropylperoxydicarbonate (IPP) (see U.S. Pat. No. 3,475,396). To effectively control molecular weight distribution in such a way to improve mechanical properties and processability of the final product, the use during the polymerization reaction of suitable chain transfer agents has been proposed. For instance, in U.S. Pat. No. 3,475,396 acetone is employed, which acts both as chain transfer agent and as conveying medium for the peroxide (IPP). Again when IPP is used as initiator, the use of isopropyl alcohol as chain transfer agent is described in U.S. Pat. No. 4,360,652. Finally, in the patent EP-387,938, PVDF is prepared using a peroxydisulphate as initiator and an alkyl acetate as molecular weight regulator. The utilization of such polar compounds as chain transfer agents has, however, the inconvenience of producing polar end-groups, which cause phenomena of product discoloration in particular during the melt processing stage.

To reduce the discoloration phenomena, in the patent EP-169,328 the use of trichlorofluoromethane as chain transfer agent in VDF polymerization is described. However, trichlorofluoromethane is a polluting product for environment, since it is a perhalogenated chlorine-containing compound and therefore having a high ozone depleting potential.

The Applicant has now found that 1,1,1-trifluoro-2,2-dichloroethane (HCFC-123) is a chain transfer agent particularly effective during VDF polymerization in an aqueous medium, and allows to obtain a final product with very good appearance, substantially devoid of discoloration effects at high temperatures.

Object of the present invention is, therefore, a process for preparing vinylidenefluoride (VDF) polymers, which comprises polymerizing VDF, optionally in association with other fluorinated olefins, in an aqueous medium in the presence of a radical initiator and of 1,1,1-trifluoro-2,2-dichloroethane (HCFC-123) as chain transfer agent.

As known, HCFC-123 is a product substitutive for conventional chlorofluorocarbons, having an ozone depleting potential which is substantially zero. It can be prepared by hydrofluorination of tetrachloroethylene as described, for instance, in U.S. Pat. No. 4,967,023.

The amount of HCFC-123 to be added to the reaction medium can vary within a wide range, depending on the molecular weight to be obtained. For instance, to obtain a PVDF having a Melt Flow Index (MFI) from 1 to 25 g/10' (measured at 230° C. with a 5 kg load according to ASTM D-1238 standard), a total amount of HCFC-123 from 0.1 to 6%, preferably from 0.3 to 3.0%, by weight with respect to the total amount of monomer fed into the reactor.

The transfer agent is continuously fed into the reactor in discrete amounts during the polymerization. Moreover, it is possible to add the transfer agent as a whole at the beginning of the polymerization. A particularly preferred way of feeding HCFC-123 is that described in European patent application No. 94107588.9, filed on May 17, 1994 in the name of the Applicant, which is herein incorporated by reference.

The polymerization reaction can be generally carried out at a temperature of from 20° to 160° C., preferably from 30° to 130° C. The reaction pressure can generally vary from 30 to 100 bar, preferably from 40 to 90 bar.

As initiator any compound capable of generating active radicals at the chosen (co)polymerization temperature can be used. It can be selected for instance from: peroxide inorganic salts, such as for instance sodium, potassium or ammonium peroxydisulphate; dialkylperoxides, such as for instance diterbutylperoxide (DTBP); dialkyiperoxydicarbonates, such as for instance diethyl- and diisopropyl-peroxydicarbonate (IPP), bis-(4-t-butyl-cyclohexyl)-peroxydicarbonate; t-alkylperoxybenzoates; t-alkylperoxypivalates, such as for instance butyl and t-amylperpivalate; acetylcyclohexane-sulphonyl peroxide; dibenzoyl peroxide dicumylperoxide.

The amount of initiator to be used is not critical, and it is generally from 0.1 to 10 $g/l_{H2O}$, preferably from 0.5 to 5 $g/l_{H2O}$.

The reaction is usually carried out in the presence of a suitable surfactant (see for instance those described in U.S. Pat. Nos. 4,360,652 and 4,025,709), to form a stable emulsion. Generally, they are fluorinated surfactants, selected from the products of general formula:

$$R_f\text{-}X^-M^+$$

wherein $R_f$ is a (per) fluoroalkyl chain $C_5$–$C_{16}$ or a (per) fluoropolyoxyalkylene chain, $X^-$ is -COO$^-$ or -SO$_3^-$, $M^{-0}$ is selected from: $H^+$, $NH_4^+$, an alkali metal ion. Among the most commonly used we cite: ammonium perfluoro-octanoate; (per) fluoropolyoxyalkylenes end-capped with one or more carboxyl groups; sulphonic acid salts of formula $R_f$-$C_2H_4SO_3H$, , wherein $R_f$ is a perfluoroalkyl $C_4$–$C_{10}$ (see U.S. Pat. No. 4,025,709); etc.

When high molecular weights are not required, for instance for formulation of paints the polymerization can be carried out without surfactants, as described in U.S. Pat. No. 5,095,081, or in suspension in the presence of a suitable suspending agent, for instance polyvinylalcohol or water-soluble cellulose derivatives as described in U.S. Pat. No. 4,524,194.

In a preferred embodiment, HCFC-123 is used as chain transfer agent in a VDF polymerization process in aqueous emulsion at a temperature of from 95° to 120° C., preferably from 100° to 115° C., as described in the above mentioned European patent application No. 94107588.9. In said process, the organic proxides having a self-accelerating decomposition temperature (SADT) higher than 50° C. are preferably used as initiators, such as for instance: diterbutylperoxide, diterbutylperoxyisopropylcarbonate, ter-butyl (2-ethyl-hexyl)-peroxycarbonate, terbutylperoxy-3,5, 5-trimethylhexanoate. According to such process, it is possible to obtain, using non-hazardous peroxide initiators, a PVDF having superior mechanical performances both at room temperature and at high temperatures, with very good processability and high thermochemical resistance to dehydrofluorination.

For the purposes of the present invention, with VDF polymerization it is meant both the VDF homopolymerization reaction and the copolymerization of a monomer mixture wherein the VDF content is prevailing, so as to obtain copolymers containing at least 50% by moles of VDF copolymerized with at least another fluorinated olefin $C_2$–$C_6$. Among the fluorinated olefins copolymerizable with VDF, particulariy the following can be used: tetrafluoroethylene (TFE), trifluoroethyiene, chlorotrifluoroethylene, hexafluoropropene (HFP), vinylfluoride, pentafluoropropene, and the like. Particularly preferred are copolymers consisting of 70–99% by moles of VDF and 1–30% by moles of TFE and/or HFP.

The process object of the present invention can be carried out in the presence of an emulsion, or, preferably, of a microemulsion of perfluoropolyoxyalkylenes, as described in U.S. Pat. Nos. 4,789,717 and 4,864,006, which are herewith incorporated by reference, or also in the presence of a microemulsion of fluoropolyoxyalkylenes having hydrogen containing end-groups and/or hydrogen-containing repetitive units, as described in European patent application No. 94107042.7, filed on May 5, 1994 in the name of the Applicant.

A mineral oil or a paraffin, liquid at the polymerization temperature, can be added to the reaction mixture, in order to inhibit coagulation of the polymer and to hinder its adhesion to reactor walls.

Some working examples of the invention are reported hereinunder, whose purpose is merely illustrative but not limitative of the scope of the invention itself.

EXAMPLE 1

In a 10 l vertical reactor equipped with a stirrer working at 480 rpm, 6.5 l of water and 35 g of paraffin wax (product AGIP$^R$ 122–126 having melting temperature of 50°–52° C.) were charged. The reactor was then brought to the working temperature of 115° C. and to a pressure of 44 relative bar by feeding gaseous VDF. 500 ml of a 1.820% by weight aqueous solution of perfluorooctanoic acid potassium salt and 23.7 g of diterbutylperoxide were then added. The VDF was continuously fed during the polymerization to maintain the pressure constant. During polymerization 0.120 moles of HCFC-123 as chain transfer agent, subdivided in 10 portions, were fed into the reactor.

Fixing a total amount of polymer to be produced equal to g, corresponding to a final concentration of polymer in water equal to 143.0 g/l$_{H2O}$, HCFC-123 was fed in 10 portions at regular 10% intervals of increase in polymer concentration with respect to the final concentration, according to the following scheme:

| Polymer concentration (g/l$_{H2O}$) | Amount of added transfer agent (moles) |
| --- | --- |
| 0 | 0.007 (6.1%) |
| 14.3 | 0.026 (22.0%) |
| 28.6 | 0.015 (12.2%) |
| 42.9 | 0.013 (11.0%) |
| 57.2 | 0.012 (9.8%) |
| 71.5 | 0.010 (8.5%) |
| 85.8 | 0.010 (8.5%) |
| 100.1 | 0.009 (7.3%) |
| 114.4 | 0.009 (7.3%) |
| 128.7 | 0.009 (7.3%) |
| 143.0 | — |

The polymer concentration in the reaction medium was monitored measuring the amount of gaseous monomer fed into the reactor after the initial charging step.

After 200 minutes the desired polymer concentration (143.0 g/l$_{H2O}$) was reached, hence the VDF feeding was stopped and the latex discharged from the reactor. The polymer was coagulated, washed with demineralized water and dried at 75° C. for 24 hours. The so obtained product was then reduced in the form of pellets by extrusion and characterized.

The MFI was measured at 230° C. with 5 kg according to ASTM D-1238 standard. By means of differential scanning calorimetry (DSC), second melting enthalpy ($\Delta H_m'$) and second melting temperature ($T_m'$) were determined.

Thermal stability of the polymer was evaluated both on the pelletized product, and on plaques (33×32×2 mm) obtained by compression moulding of the product powder at 200° C. for 2 min, after 4 min of pre-heating. To better show possible discoloration effects, colour of the plaques after treatment in a stove at 250° C. for 2 hours was also evaluated. The visual colour evaluation scale was fixed between 0 (white) and 5 (black). The data are reported in Table 1.

EXAMPLE 2 (comparative)

Example 1 was repeated in the same conditions, using as chain transfer agent methyl-terbutylether in a total amount of 0.07 moles subdivided in 10 pertions and introduced into the reactor according to the same modalities of Example 1.

The obtained product was characterized as described above. The data are reported in Table 1..

EXAMPLE 3

The VDF polymerization was carried out in a 7.5 l horizontal reactor equipped with a mechanical stirrer. 5.5 l of water, 4 g of paraffin wax and 115 ml of a 2% by weight aqueous solution of fluorinated surfactant Surflon$^{(R)}$ S111S (produced by Asahi Glass Co.) were loaded. The reactor was then brought to the working temperature of 115° C. and to a pressure of 50 absolute bar by feeding gaseous VDF. 15.1 g of diterbutylperoxide were then added and VDF was continuously fed during polymerization to maintain the pressure constant. At the polymerization start 0.279 moles of HCFC-123 as chain transfer agent were fed. The polymerization was carried out for 269 min until 2291 g of polymer were obtained, corresponding to a concentration of 417 g/l$_{H2O}$.

The obtained product was characterized as described in Example 1. The data are reported in Table 1.

TABLE 1

| PROPERTIES | EX. 1 | EX. 2(*) | EX. 3 |
| --- | --- | --- | --- |
| MFI (g/10') | 1.3 | 0.8 | 2.8 |
| $\Delta H_m'$ (cal/g) | 13.5 | 13.5 | 13.0 |
| $T_m'$ (°C.) | 164 | 163 | 164 |
| colour of pellets | 0 | 2 | 0 |
| colour of plaque compression moulded at 200° C. for 2 min | 0 | 2 | 0 |
| colour of plaque treated at 250° C. for 2 hours | 1 | 4 | 1 |

(*)comparative

We claim:

1. Process for preparing vinylidenefluoride (VDF) polymers, which comprises polymerizing VDF, optionally in association with other fluorinated olefins, in an aqueous medium in the presence of a radical inititator and of 1,1,1-trifluoro-2,2-dichloroethane (HCFC-123) as chain transfer agent.

2. Process according to claim 1, wherein a total amount of HCFC-123 of from 0.1 to 6% by weight, with respect to the total amount of fed monomer, is fed into the reaction medium.

3. Process according to claim 1 or 2, wherein the polymerization temperature is from 20° to 160° C.

4. Process according to claim 3, wherein the polymerization is carried out in aqueous emulsion at a temperature of from 95° to 120° C. and using as initiator an organic peroxide having a self-accelerating decomposition temperature (SADT) higher than 50° C.

* * * * *